(12) United States Patent
Khlat et al.

(10) Patent No.: US 7,593,491 B1
(45) Date of Patent: Sep. 22, 2009

(54) QUADRATURE SINGLE-MIXER MULTI-MODE RADIO FREQUENCY RECEIVER

(75) Inventors: Nadim Khlat, Cugnaux (FR); Marcus Granger-Jones, Scotts Valley, CA (US); Mark Alexander John Moffat, Mortimer (GB)

(73) Assignee: RF Micro Devices, Inc., Greensboro, NC (US)

( * ) Notice: Subject to any disclaimer, the term of this patent is extended or adjusted under 35 U.S.C. 154(b) by 543 days.

(21) Appl. No.: 11/538,318

(22) Filed: Oct. 3, 2006

(51) Int. Cl.
*H04L 27/06* (2006.01)

(52) U.S. Cl. .................. 375/344; 375/261; 375/324; 329/302; 329/306; 329/324; 455/134; 455/182.2; 455/192.2; 455/226.2

(58) Field of Classification Search ............... 375/260, 375/261, 269, 272, 279, 320, 323, 324, 334, 375/340, 344; 329/302, 306, 323, 324; 455/182.1, 455/182.2, 192.1, 192.2, 196.1, 197.1, 134, 455/139, 226.2
See application file for complete search history.

(56) References Cited

U.S. PATENT DOCUMENTS

| | | | |
|---|---|---|---|
| 6,560,447 B2 | 5/2003 | Rahman et al. | |
| 6,597,748 B1 | 7/2003 | Hietala et al. | |
| 6,606,359 B1 | 8/2003 | Nag et al. | |
| 6,678,340 B1 | 1/2004 | Khlat et al. | |
| 6,845,233 B2 * | 1/2005 | Louis et al. | ................. 455/313 |
| 6,959,170 B2 * | 10/2005 | Vannatta et al. | ........... 455/67.11 |
| 7,136,431 B2 * | 11/2006 | Shi et al. | .................... 375/319 |
| 7,469,136 B2 * | 12/2008 | Hayek et al. | ................ 455/324 |

* cited by examiner

*Primary Examiner*—Dac V Ha
(74) *Attorney, Agent, or Firm*—Withrow & Terranova, P.L.L.C.

(57) ABSTRACT

The present invention is a quadrature multi-mode RF receiver that uses a single quadrature mixer for tuning to desired frequency bands. In a direct conversion mode of operation, the RF receiver down converts a received RF signal directly into a baseband signal. In a VLIF mode of operation, the RF receiver down converts a received RF signal into a VLIF signal. When receiving a wanted RF signal, the frequency of the resulting VLIF signal is called the wanted VLIF frequency, and is based on the signal strength of the received RF signal. In one embodiment of the present invention, the wanted VLIF frequency is selected to be one of two VLIF frequencies. The wanted VLIF frequency is inversely related to the signal strength of the received RF signal.

20 Claims, 6 Drawing Sheets

QUADRATURE SINGLE-MIXER MULTI-MODE RADIO FREQUENCY RECEIVER

FIELD OF THE INVENTION

The present invention relates to radio frequency (RF) receivers used in RF communications systems.

BACKGROUND OF THE INVENTION

With the growth of the wireless communications industry, wireless communications protocols have become more sophisticated. Communications systems may have to provide support for multiple communications protocols. One such system is the Universal Mobile Telecommunications System (UMTS), which may require support for both Wide Band Code Division Multiple Access (WBCDMA) and Enhanced General Packet Radio Service (EGPRS) communications protocols. These two protocols have many differences such that two different RF receiver architectures may be needed. RF receivers are often battery powered and must function with minimal power consumption, cost, and space. As a result, there is a need for a single radio receiver that can efficiently operate in at least two different operating modes, using two different receiver architectures.

A traditional RF receiver architecture is the super-heterodyne architecture in which a received RF signal is mixed with a local oscillator signal to obtain a lower intermediate frequency (IF) signal. The IF signal is then filtered to the desired channel bandwidth to remove interfering signals and signals from adjacent channels. As channel bandwidths become narrower, the inclination is to reduce the frequency of the IF signal. As a result, receivers using a very low intermediate frequency (VLIF) for their IF sections are becoming increasingly common for certain communications protocols; however, some image frequencies may not be removed with upstream RF bandpass filtering. Another example is a direct-conversion receiver, which has a direct current (DC) IF signal; however, problems with 1/f noise, DC offsets, and second-order inter-modulation (IIP2) effects may eliminate the direct-conversion receiver from some applications. The WBCDMA protocol lends itself to direct-conversion, but the EGPRS protocol lends itself to VLIF. A receiver with a different receive path for each protocol could be used in a UMTS system; however, since the WBCDMA protocol and the EGPRS protocol do not operate simultaneously, a receiver with a single receive path for both protocols could reduce cost, complexity, and current consumption.

One design challenge in a VLIF receiver is rejection of image frequencies. In any heterodyne receiver, when a received RF input signal $F_R$, mixes with a local oscillator signal $F_{LO}$, the mixer produces an output signal with sums and differences of $F_R$ and $F_{LO}$. Specifically, the frequencies of $F_R-F_{LO}$, $F_{LO}-F_R$, and $F_R+F_{LO}$ are the dominant mixer output frequency combinations. If $F_{LO}$ is chosen with a lower frequency than a desired RF input signal $F_{DRF}$, then the $F_R-F_{LO}$ portion of the mixer output signal produces a wanted VLIF signal $F_{DVLIF}$; however, the mixer output signal will also include an $F_R+F_{LO}$ image signal, which is close to double the frequency of $F_{DRF}$ and easily removed by IF bandpass filtering. If a blocking image signal $F_{BIS}$ with a frequency located at a frequency of $F_{LO}$ minus the frequency of $F_{DVLIF}$ is received, the $F_{LO}-F_R$ portion of the mixer output will produce an image that is identical in frequency with $F_{DVLIF}$, and cannot be removed with normal IF filtering techniques; therefore, if upstream RF bandpass filtering cannot remove the blocking image signal, then other techniques must be used to remove the signal. However, since the blocking signal is phase-shifted by 180 degrees from $F_{DVLIF}$, a quadrature receiver architecture can be used to filter out the blocking image signal. A quadrature receiver architecture uses two mixers receiving the same RF input signal, which is mixed with two different local oscillator signals that are equal in frequency and phase-shifted from each other by 90 degrees. Complex filtering methods can then be used to filter out the blocking image signal. Any mismatch between the processing of in-phase signals and quadrature-phase signals will result in degradation of the rejection of image signals.

There is a special situation in which a frequency of the wanted VLIF signal $F_{DVLIF}$, called the wanted VLIF frequency, is less than the frequencies of blocking image signals. In this special situation, there is a benefit to reducing the wanted VLIF frequency, namely improved image rejection; however, a lower frequency increases 1/f noise, DC offsets, and IIP2 problems, which reduces the effective sensitivity of the receiver. In some networks, there is a loose correlation between the signal strength of a desired signal and the signal strength of interfering image signals; therefore, when the signal strength of a desired signal is small, a higher VLIF frequency is desirable to increase receiver sensitivity. The resulting reduced image rejection is acceptable, since the signal strengths of interfering image signals are also small. Likewise, when signal strengths of interfering image signals are large, a larger VLIF frequency is desirable to increase image rejection. The resulting reduced receiver sensitivity is acceptable, since the signal strength of the desired signal is also large; therefore, in some networks, it would be beneficial to have an inverse correlation of the VLIF frequency with signal strength.

Given the above factors, a need exists for a quadrature single-path receiver that can support both direct conversion and VLIF modes of operation, can adjust the VLIF frequency based on received signal strength, and can effectively reject image interfering signals with filtering, matching between the circuitry processing the in-phase signals and the quadrature-phase signals, or both.

SUMMARY OF THE INVENTION

The present invention is a quadrature multi-mode RF receiver that uses a single quadrature mixer for tuning to desired frequency bands. In a direct conversion mode of operation, the RF receiver down converts a received RF signal directly into a baseband signal. In a VLIF mode of operation, the RF receiver down converts a received RF signal into a VLIF signal. When receiving a wanted RF signal, the frequency of the resulting VLIF signal is called the wanted VLIF frequency, and is based on the signal strength of the received RF signal. In one embodiment of the present invention, the wanted VLIF frequency is selected to be one of two VLIF frequencies. The wanted VLIF frequency is inversely related to the signal strength of the received RF signal. For example, a higher wanted VLIF frequency is selected when receiving smaller RF signals to increase effective receiver sensitivity. The higher VLIF frequency reduces de-sensitization due to 1/f noise, DC offsets, inter-modulation effects, or any combination thereof. A lower wanted VLIF frequency is selected when receiving large RF signals to improve image rejection. The lower VLIF frequency improves rejection of blocking image signals by moving the VLIF frequency of the blocking image signal away from the wanted VLIF frequency, which allows IF filtering of some of the blocking image signal using real filtering in addition to complex filtering. A quadrature multi-mode RF receiver using a single quadrature mixer can be of lower cost and complexity than receivers using multiple quadrature mixers.

Certain embodiments of the present invention may use programmable real filters, polyphase filters, or both to reject image interfering signals. In the direct conversion mode of operation, bypass circuitry may be used to bypass all or part of the filters. Certain embodiments of the present invention may use quadrature gain correction circuitry, quadrature phase correction circuitry, or both to match the circuitry processing the in-phase signals and the quadrature-phase signals to improve image rejection. Certain embodiments of the present invention may convert the quadrature receiver signals into digital signals using analog-to-digital (A-to-D) conversion. Digital circuitry may provide real filtering, polyphase filtering, down conversion, gain correction, phase correction, processing, or any combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a quadrature multi-mode RF receiver that uses a single quadrature mixer for tuning to desired frequency bands. In a direct conversion mode of operation, the RF receiver down converts a received RF signal directly into a baseband signal. In a VLIF mode of operation, the RF receiver down converts a received RF signal into a VLIF signal. When receiving a wanted RF signal, the frequency of the resulting VLIF signal is called the wanted VLIF frequency, and is based on the signal strength of the received RF signal. In one embodiment of the present invention, the wanted VLIF frequency is selected to be one of two VLIF frequencies. The wanted VLIF frequency is inversely related to the signal strength of the received RF signal. For example, a higher wanted VLIF frequency is selected when receiving smaller RF signals to increase effective receiver sensitivity. The higher VLIF frequency reduces de-sensitization due to 1/f noise, DC offsets, inter-modulation effects, or any combination thereof. A lower wanted VLIF frequency is selected when receiving large RF signals to improve image rejection. The lower VLIF frequency improves rejection of blocking image signals by moving the VLIF frequency of the blocking image signal away from the wanted VLIF frequency, which allows IF filtering of some of the blocking image signal using real filtering in addition to complex filtering. A quadrature multi-mode RF receiver using a single quadrature mixer can be of lower cost and complexity than receivers using multiple quadrature mixers.

Certain embodiments of the present invention may use programmable real filters, polyphase filters, or both to reject image interfering signals. In the direct conversion mode of operation, bypass circuitry may be used to bypass all or part of the filters. Certain embodiments of the present invention may use quadrature gain correction circuitry, quadrature phase correction circuitry, or both to match the circuitry processing the in-phase signals and the quadrature-phase signals to improve image rejection. Certain embodiments of the present invention may convert the quadrature receiver signals into digital signals using analog-to-digital (A-to-D) conversion. Digital circuitry may provide real filtering, polyphase filtering, down conversion, gain correction, phase correction, processing, or any combination thereof.

Figure 1:
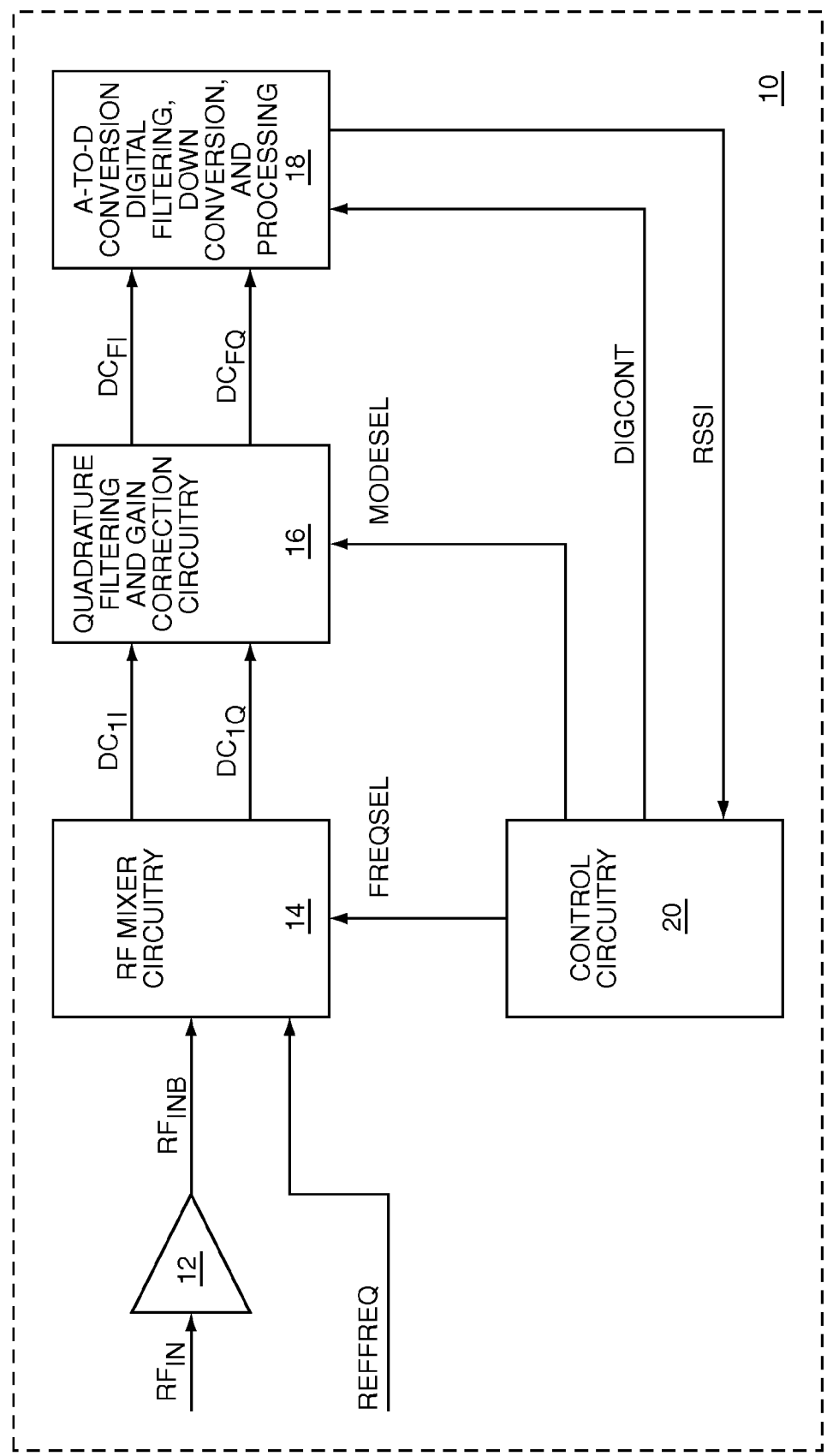
FIG. 1 shows one embodiment of the present invention used in a quadrature multi-mode RF receiver.

FIG. 1 shows one embodiment of the present invention used in a quadrature multi-mode RF receiver 10. An RF input signal $RF_{IN}$ is received by an RF amplifier 12, which buffers the RF input signal $RF_{IN}$ to create a buffered RF input signal $RF_{INB}$. RF mixer circuitry 14 receives and splits the buffered RF input signal $RF_{INB}$ into two signals, which are mixed with quadrature local oscillator signals to create a first in-phase down converted output signal $DC_{1I}$ and a first quadrature-phase down converted output signal $DC_{1Q}$. The RF mixer circuitry 14 includes a frequency synthesizer to create the quadrature local oscillator signals using a reference frequency signal REFFREQ. The RF mixer circuitry 14 receives a frequency select signal FREQSEL to select the frequency of the quadrature local oscillator signals.

In the direct conversion mode of operation, the frequency of the quadrature local oscillator signals are approximately equal to the frequency of a wanted RF input signal $RF_{IN}$ such that the first down converted output signals $DC_{1I}$, $DC_{1Q}$ are baseband signals. In the VLIF mode of operation, the frequency of the quadrature local oscillator signals is selected to be either higher or lower than the frequency of the wanted RF input signal $RF_{IN}$ such that the first down converted output signals $DC_{1I}$, $DC_{1Q}$ are VLIF signals with a wanted VLIF frequency. The wanted VLIF frequency is inversely related to the signal strength of the RF input signal $RF_{IN}$, and may be one of two VLIF frequencies; therefore, the frequency of the quadrature local oscillator signals is selected to provide the wanted VLIF frequency. In an exemplary embodiment of the present invention, when the signal strength of the RF input signal $RF_{IN}$ is strong, the wanted VLIF frequency is approximately 120 kilohertz, and when the signal strength of the RF input signal $RF_{IN}$ is weak, the wanted VLIF frequency is approximately 175 kilohertz.

The RF mixer circuitry 14 feeds the first down converted output signals $DC_{1I}$, $DC_{1Q}$ into quadrature filtering and gain correction circuitry 16, which filters out unwanted signals and matches the in-phase signals and the quadrature-phase signals to create a filtered in-phase down converted output signal $DC_{FI}$ and a filtered quadrature-phase down converted output signal $DC_{FQ}$. The quadrature filtering and gain correction circuitry 16 receives a mode select signal MODESEL to configure quadrature filters appropriately when operating in either the direct conversion mode of operation or the VLIF mode of operation. The quadrature filtering and gain correction circuitry 16 feeds the filtered down converted output signals $DC_{FI}$, $DC_{FQ}$ into A-to-D conversion, digital filtering, down conversion, and processing circuitry, which converts the filtered down converted output signals $DC_{FI}$, $DC_{FQ}$ from analog signals into digital signals. The digital signals are digitally filtered to remove adjacent channels, images, and any other interfering signals. Any needed down conversion, de-modulation, or signal processing is performed on the digital signals. Signal strengths of wanted and interfering signals may be measured and provided in a RF signal strength signal RSSI. Any required mode, or control information is received from a digital control signal DIGCONT. Control circuitry 20 chooses the mode of operation, receives the RF signal strength signal RSSI, and then chooses the appropriate frequency of the quadrature local oscillator signals. The control circuitry 20 provides the frequency select signal FREQSEL, the mode select signal MODESEL, and the digital control signal DIGCONT with the proper information.

Figure 2:
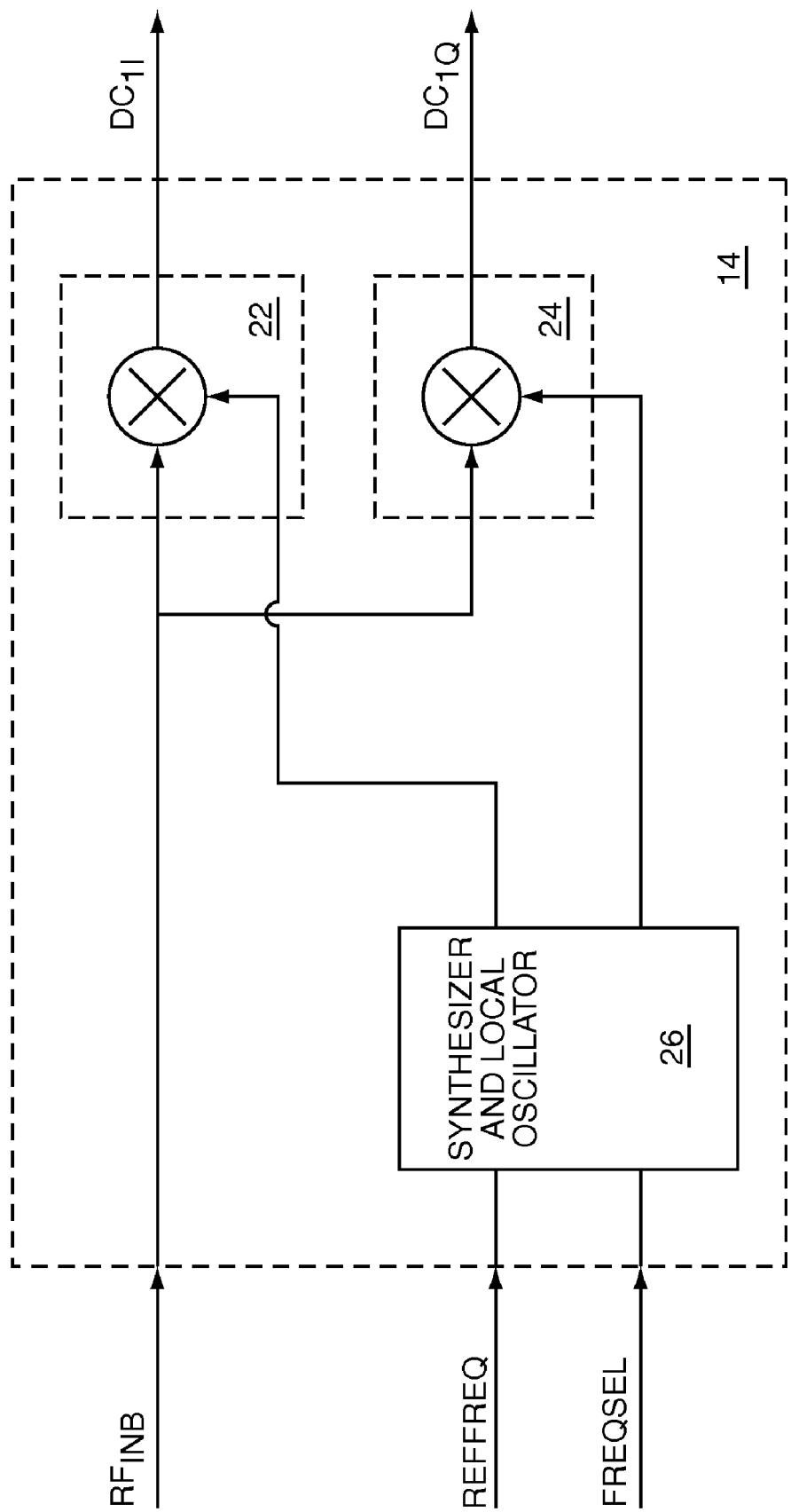
FIG. 2 shows details of the RF mixer circuitry of FIG. 1.

FIG. 2 shows details of the RF mixer circuitry 14 of FIG. 1. An in-phase mixer 22 and a quadrature-phase mixer 24 receive the buffered RF input signal $RF_{INB}$. A synthesizer and local oscillator 26 receives the reference frequency signal REFFREQ to support synthesis of any needed local oscillator frequency, and the frequency select signal FREQSEL to select the frequency of the quadrature local oscillator signals. The synthesizer and local oscillator 26 provides an in-phase local oscillator signal to the in-phase mixer 22, and a quadrature-phase local oscillator signal to the quadrature-phase mixer 24. The mixers 22, 24 mix the local oscillator signals with the buffered RF input signal $RF_{INB}$ to create the first down converted output signals $DC_{1I}$, $DC_{1Q}$.

Figure 3:
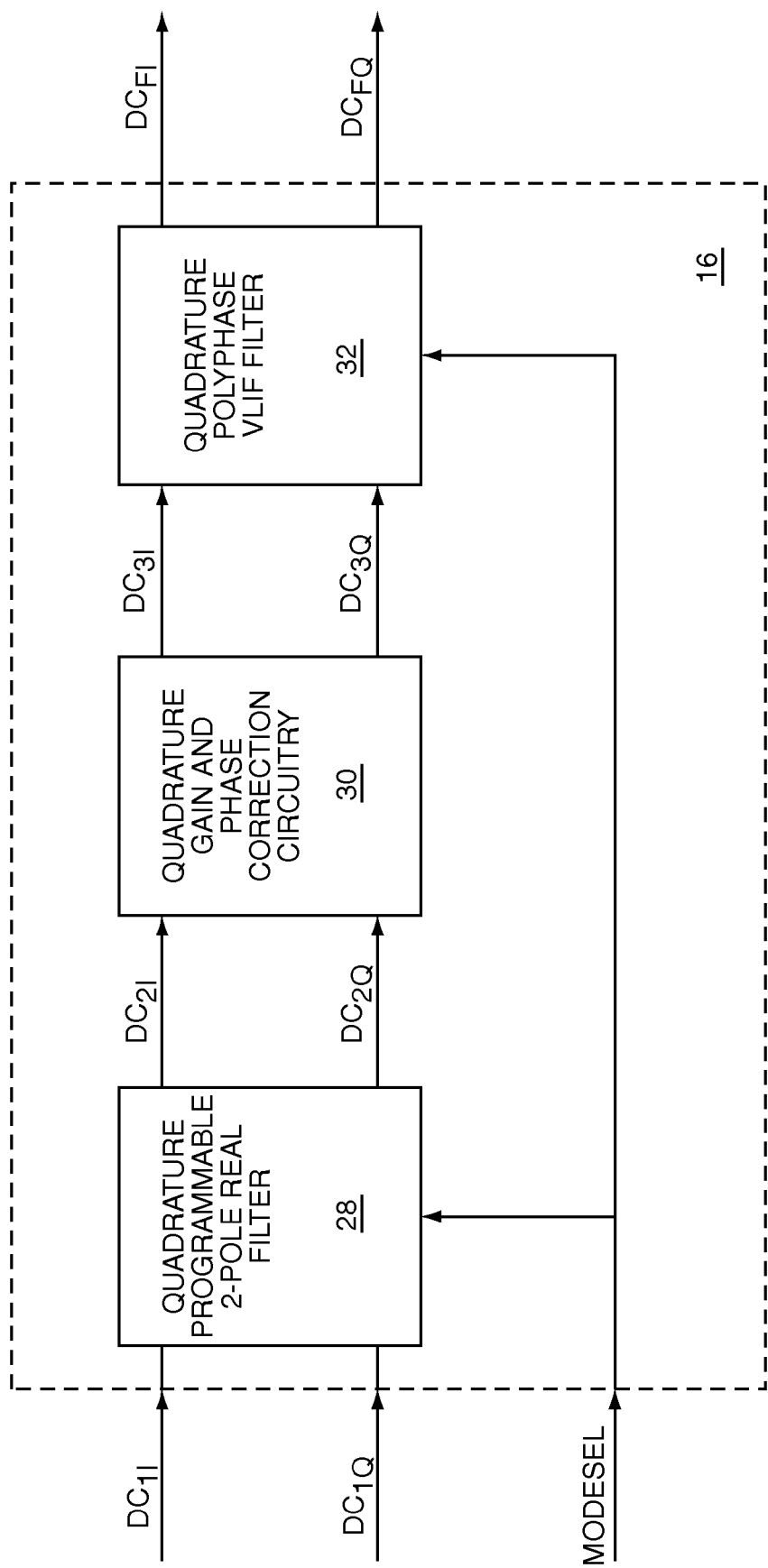
FIG. 3 shows details of the quadrature filtering and gain correction circuitry of FIG. 1.

FIG. 3 shows details of the quadrature filtering and gain correction circuitry 16 of FIG. 1. The first down converted output signals $DC_{1I}$, $DC_{1Q}$ feed a quadrature programmable 2-pole real filter 28, which provides filtering of some image and interfering signals. Quadrature real filters process each quadrature leg independently, whereas quadrature polyphase filters process each quadrature leg using signals from both quadrature legs. The quadrature programmable 2-pole real filter 28 receives the mode select signal MODESEL to configure quadrature filters appropriately when operating in either the direct conversion mode of operation or the VLIF mode of operation. For example, in a WBCDMA and EGPRS system, WBCDMA signals are received when operating in the direct conversion mode of operation; therefore, the quadrature programmable 2-pole real filter 28 is configured to receive the large bandwidth associated with WBCDMA signals. EGPRS signals are received when operating in the VLIF mode of operation; therefore, the quadrature programmable 2-pole real filter 28 is configured to receive the narrow bandwidth associated with EGPRS VLIF signals. The quadrature programmable 2-pole real filter 28 provides a second in-phase down converted output signal $DC_{2I}$ and a second quadrature-phase down converted output signal $DC_{2Q}$ to quadrature gain and phase correction circuitry 30, which applies gain and phase correction factors to the second down converted output signals $DC_{2I}$, $DC_{2Q}$ to create a third in-phase down converted output signal $DC_{3I}$ and a third quadrature-phase down converted output signal $DC_{3Q}$. The third down converted output signals $DC_{3I}$, $DC_{3Q}$ are approximately equal in amplitude and phase-shifted 90 degrees from each other, which provides optimal downstream complex filtering.

The third down converted output signals $DC_{3I}$, $DC_{3Q}$ feed a quadrature polyphase VLIF filter 32 having a bypass mode, which provides additional filtering of VLIF image signals when operating in the VLIF mode of operation to create the filtered down converted output signals $DC_{FI}$, $DC_{FQ}$. When operating in the direct conversion mode of operation, bypass circuitry bypasses internal filter circuitry by routing the third down converted output signals $DC_{3I}$, $DC_{3Q}$ to directly provide the filtered down converted output signals $DC_{FI}$, $DC_{FQ}$. In one embodiment of the present invention, the quadrature polyphase VLIF filter 32 may be configured as a real filter to provide additional filtering when operating in the direct conversion mode of operation, such as when receiving WBCDMA signals.

Figure 4:
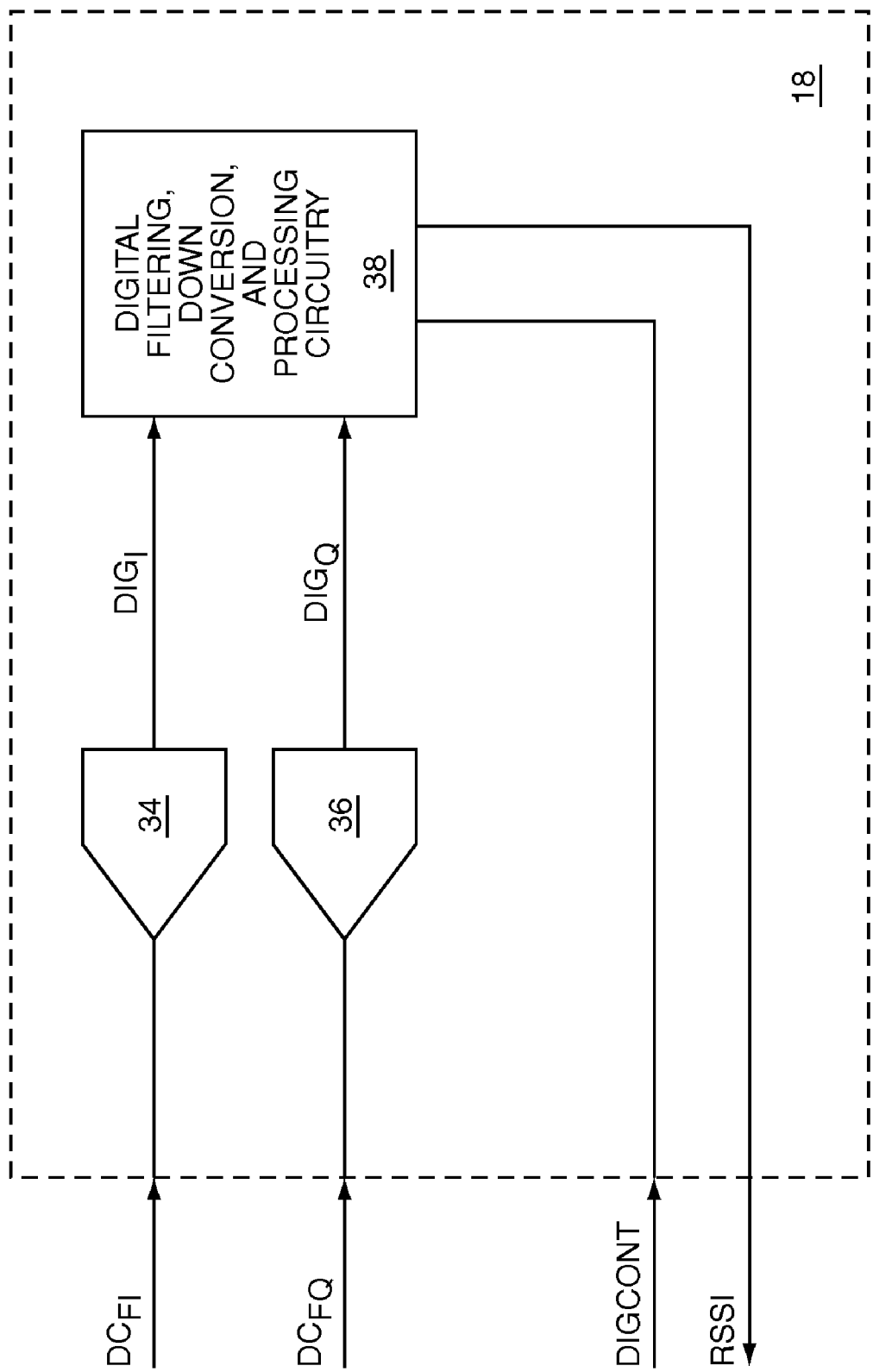
FIG. 4 shows details of the A-to-D conversion, digital filtering, down conversion, and processing circuitry of FIG. 1.

FIG. 4 shows details of the A-to-D conversion, digital filtering, down conversion, and processing circuitry 18 of FIG. 1. The filtered down converted output signals $DC_{FI}$, $DC_{FQ}$ feed an in-phase A-to-D converter 34 and a quadrature-phase A-to-D converter 36, which convert the analog signals $DC_{FI}$, $DC_{FQ}$ into a digital in-phase down converted output signal $DIG_I$ and a digital quadrature-phase down converted output signal $DIG_Q$. The A-to-D converters 34, 36 feed the digital down converted output signals $DIG_I$, $DIG_Q$ into digital filtering, down conversion, and processing circuitry 38. The digital signals $DIG_I$, $DIG_Q$ are digitally filtered to remove adjacent channels, images, and any other interfering signals. Any needed down conversion, de-modulation, or signal processing is performed on the digital signals. Signal strengths of wanted and interfering signals may be measured and provided in the RF signal strength signal RSSI. Any required mode or control information is received from the digital control signal DIGCONT. Other embodiments of the present invention may eliminate all or part of the quadrature filtering and gain correction circuitry 16; however, since all filtering and image rejection would need to be handled by the digital filtering, down conversion, and processing circuitry 38, A-to-D converters 34, 36 with larger dynamic ranges may be required.

In an exemplary embodiment of the present invention, a UMTS system supports both WBCDMA and EGPRS communications protocols. The direct conversion mode of operation is used when receiving WBCDMA signals, and the VLIF mode of operation is used when receiving EGPRS signals. The VLIF mode of operation uses one of two wanted VLIF frequencies, which are approximately 120 kilohertz and 175 kilohertz. Alternate systems may have an interfering RF signal at approximately 400 kilohertz from a wanted RF signal. Other interfering systems may have an interfering RF signal at approximately 600 kilohertz from the wanted RF signal. The A-to-D converters 34, 36 have a dynamic range of approximately 85 db to handle the dynamic range of wanted signals and a synthesizer with phase noise of about 36 db. Without a quadrature polyphase VLIF filter 32, the dynamic range of the A-to-D converters 34, 36 would have to handle the dynamic ranges of interfering image signals, which would be approximately 95 db for the 400 kilohertz interfering signal and 104 db for the 600 kilohertz interfering signal. Such wide dynamic ranges would increase the cost, complexity, and current consumption of the A-to-D converters 34, 36; therefore, the quadrature polyphase VLIF filter 32 must filter interfering image signals sufficiently to be handled by the A-to-D converters 34, 36 with a dynamic range of approximately 85 db. Thus, the quadrature polyphase VLIF filter 32 must reduce 400 kilohertz image signals by at least 10 db and 600 kilohertz image signals by at least 19 db.

Figure 5:
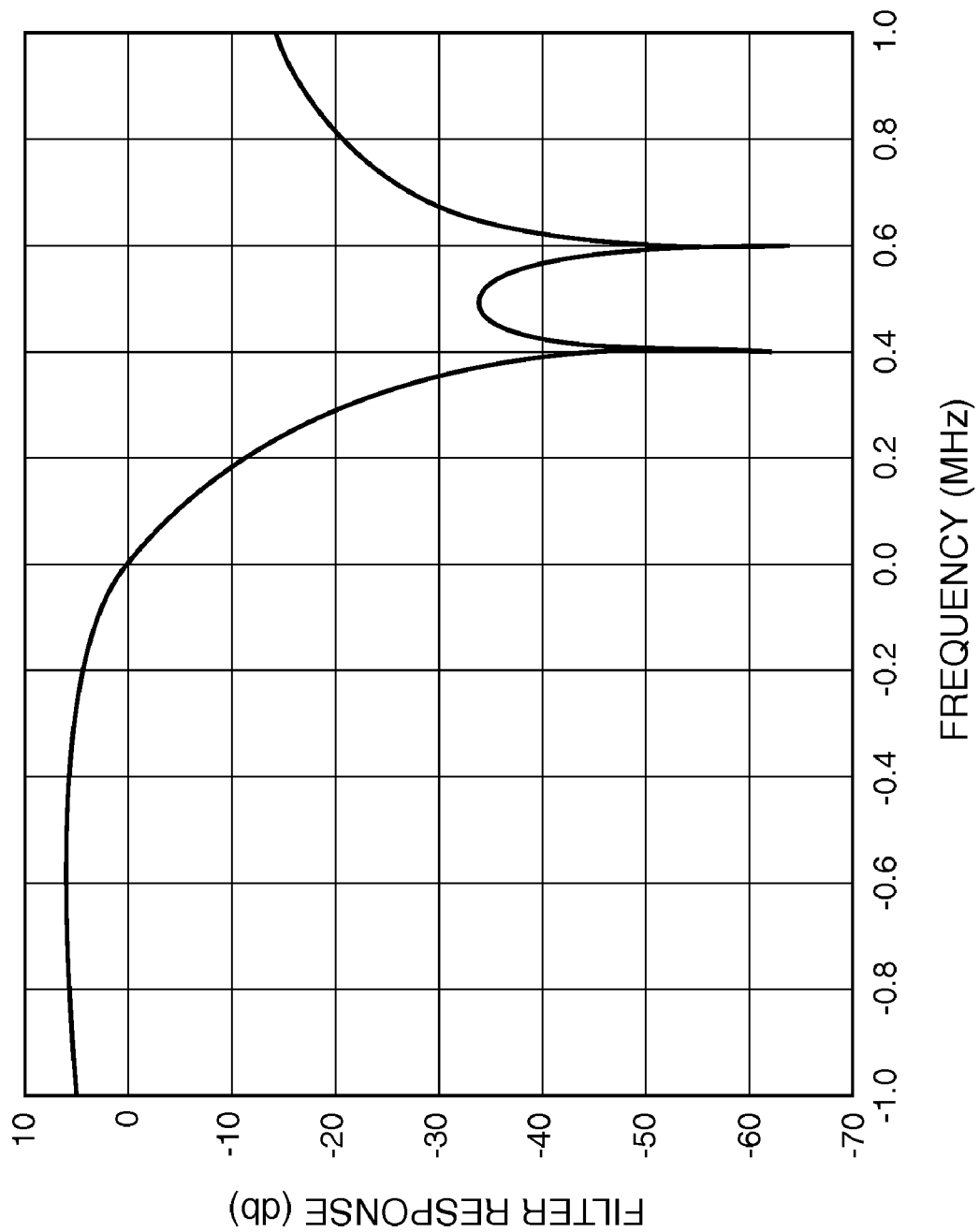
FIG. 5 shows a graph of the frequency response of a 2-pole passive polyphase VLIF notch filter.

FIG. 5 shows a graph of the frequency response of a 2-pole passive polyphase VLIF notch filter with one notch at 400 kilohertz and a second notch at 600 kilohertz. If the wanted VLIF frequency is −120 kilohertz, then the received RF input signal $F_R$ minus the local oscillator signal $F_{LO}$ is equal to −120 kilohertz; therefore, the 400 kilohertz (khz) interfering image signal produces a VLIF signal at 400 khz-120 khz, or 280 khz. From the graph, if the 400 khz interfering image signal is spread between 180 khz and 380 khz, then the signal is reduced by at least 12 db. Likewise, the 600 khz interfering image signal produces a VLIF signal at 600 khz-120 khz, or 480 khz. From the graph, if the 600 khz interfering image signal is spread between 380 khz and 580 khz, then the signal is reduced by at least 33 db. Additionally, by moving the VLIF frequency of the interfering image signal away from the wanted VLIF frequency, some of the interfering image signal can be filtered using the quadrature programmable 2-pole real filter 28. For example, if the wanted RF signal has a signal strength of −82 dbm, a 400 khz interfering image signal has a signal strength of −41 dbm, and the receiver requires the down converted ratio of the wanted signal to interfering image signal to be at least 9 db, then the signal strength of the interfering image signal must be reduced by at least 51 db. By using a wanted VLIF frequency of −120 khz, the quadrature programmable 2-pole real filter 28 helps reject the interfering image signal. If the quadrature programmable 2-pole real filter 28 attenuates the interfering image signal by 8 db, then the quadrature polyphase VLIF filter 32 and the downstream digital filtering need to attenuate the interfering image signal by 43 db. If the wanted VLIF frequency was −175 khz, then most of the filtering of the interfering image signal would have to be handled by the downstream digital filtering, which would require A-to-D converters 34, 36 with large dynamic ranges.

If the received signal strengths, both wanted and interfering, were low enough, the wanted VLIF frequency could be increased to −175 kilohertz, such that the 400 khz interfering image signal would produce a VLIF signal of 225 khz, and the 600 khz interfering image signal would produce a VLIF signal of 425 khz. From the graph, the 400 khz interfering image signal is reduced by at least 5 db, and the 600 khz interfering image signal is reduced by at least 22 db. By increasing the wanted VLIF frequency, image rejection decreases, but receiver sensitivity increases, which is desired behavior when signal strengths are smaller.

When receiving EGPRS signals, large amplitude modulated (AM) interfering signals may be received with a signal strength up to −23 dbm and a carrier frequency offset by approximately 3 megahertz from the carrier frequency of a wanted EGPRS signal. Such interfering signals will be removed primarily by the quadrature programmable 2-pole real filter 28.

Certain embodiments of the present invention may select the frequency of the quadrature local oscillator signals to be either higher or lower than the frequency of the wanted RF input signal $RF_{IN}$ during the VLIF mode of operation. The selection may be based upon which frequency reduces the magnitude of interfering signals, as indicated by the signal strength of the RF input signal $RF_{IN}$.

Figure 6:
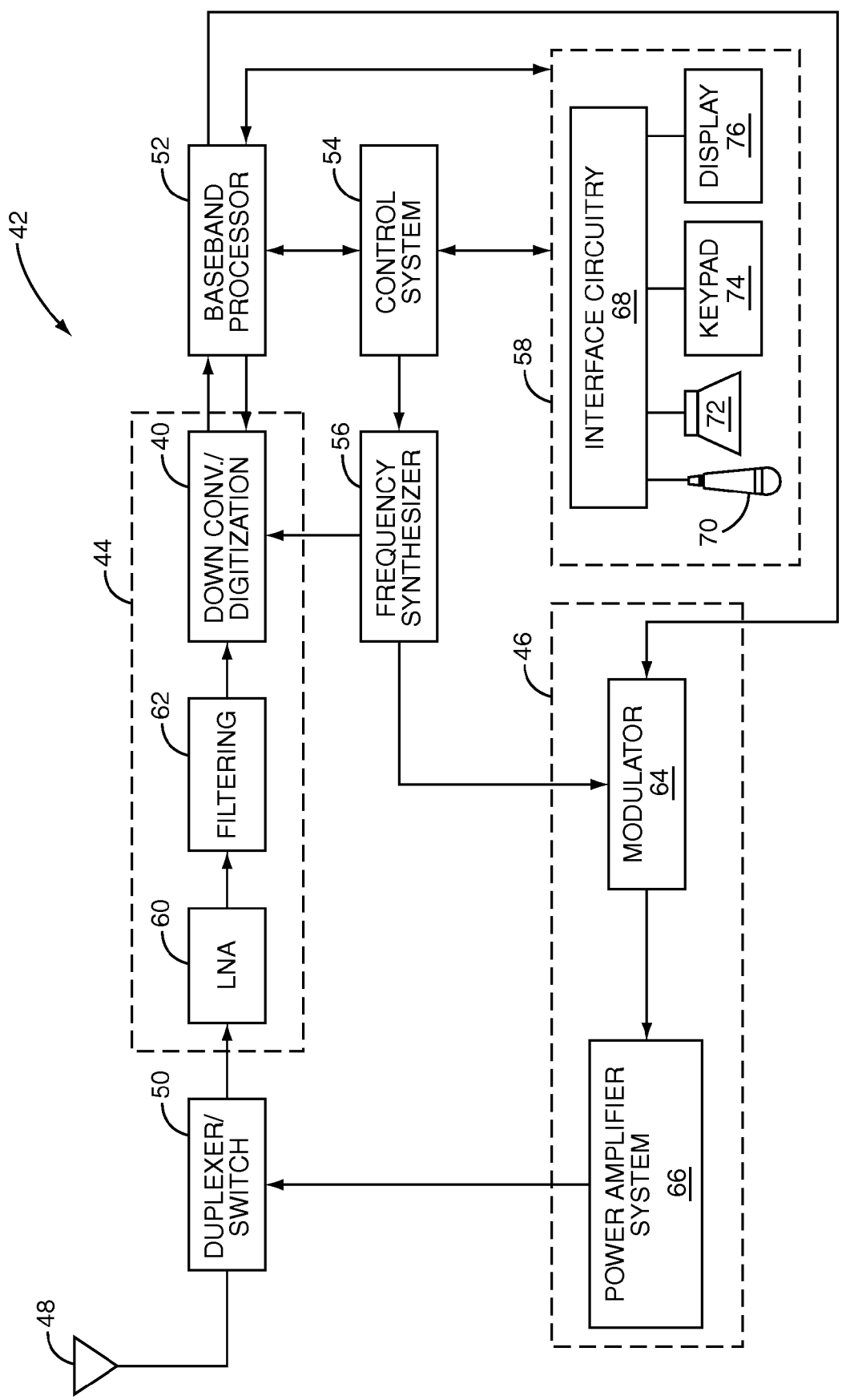
FIG. 6 shows an application example of the present invention used in a mobile terminal.

An application example of a quadrature RF power amplifier is its use in down conversion and digitization circuitry 40 in a mobile terminal 42. The basic architecture of the mobile terminal 42 is represented in FIG. 6 and may include a receiver front end 44, a radio frequency transmitter section 46, an antenna 48, a duplexer or switch 50, a baseband processor 52, a control system 54, a frequency synthesizer 56, and an interface 58. The receiver front end 44 receives information bearing radio frequency signals from one or more remote transmitters provided by a base station. A low noise amplifier (LNA) 60 amplifies the signal. A filter circuit 62 minimizes broadband interference in the received signal, while the down conversion and digitization circuitry 40 downconverts the filtered, received signal to an intermediate or baseband frequency signal, which is then digitized into one or more digital streams. The baseband processor 52 provides mode and channel information to the down conversion and digitization circuitry 40. The receiver front end 44 typically uses one or more mixing frequencies generated by the frequency synthesizer 56. The baseband processor 52 processes the digitized received signal to extract the information or data bits conveyed in the received signal. This processing typically comprises demodulation, decoding, and error correction operations. As such, the baseband processor 52 is generally implemented in one or more digital signal processors (DSPs).

On the transmit side, the baseband processor 52 receives digitized data, which may represent voice, data, or control information, from the control system 54, which it encodes for transmission. The encoded data is output to the transmitter 46, where it is used by a modulator 64 to modulate a carrier signal that is at a desired transmit frequency. A power amplifier system 66 amplifies the modulated carrier signal to a level appropriate for transmission, and delivers the amplified and modulated carrier signal to the antenna 48 through the duplexer or switch 50.

A user may interact with the mobile terminal 42 via the interface 58, which may include interface circuitry 68 associated with a microphone 70, a speaker 72, a keypad 74, and a display 76. The interface circuitry 68 typically includes analog-to-digital converters, digital-to-analog converters, amplifiers, and the like. Additionally, it may include a voice encoder/decoder, in which case it may communicate directly with the baseband processor 52. The microphone 70 will typically convert audio input, such as the user's voice, into an electrical signal, which is then digitized and passed directly or indirectly to the baseband processor 52. Audio information encoded in the received signal is recovered by the baseband processor 52, and converted by the interface circuitry 68 into an analog signal suitable for driving the speaker 72. The keypad 74 and display 76 enable the user to interact with the mobile terminal 42, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A quadrature radio frequency (RF) receiver comprising:
   RF mixer circuitry adapted to:
      receive an RF input signal;
      receive a frequency select signal; and
      provide a down converted output signal based on mixing the RF input signal with a local oscillator signal, which is a function of the frequency select signal; and
   control circuitry adapted to:
      receive an RF signal strength signal based on a signal strength of the RF input signal;
      select one of a direct conversion receive mode and a very low intermediate frequency (VLIF) receive mode;

for the direct conversion receive mode, generate the frequency select signal to cause the RF mixer circuitry to down convert the RF input signal to a baseband signal; and for the VLIF receive mode, generate the frequency select signal based on the RF signal strength signal to cause the RF mixer circuitry to down convert the RF input signal to a VLIF signal.

2. The quadrature RF receiver of claim 1 wherein the RF mixer circuitry further comprises:

a single in-phase mixer adapted to provide an in-phase down converted output signal for the direct conversion receive mode and the VLIF receive mode; and a single quadrature-phase mixer adapted to provide a quadrature-phase down converted output signal for the direct conversion receive mode and the VLIF receive mode.

3. The quadrature RF receiver of claim 2 wherein:

the single in-phase mixer is further adapted to receive an in-phase local oscillator signal; and the single quadrature-phase mixer is further adapted to receive a quadrature-phase local oscillator signal, wherein the in-phase local oscillator signal and quadrature-phase local oscillator signal are approximately equal in amplitude and approximately phase-shifted 90 degrees from each other.

4. The quadrature RF receiver of claim 2 further comprising a quadrature filter circuit adapted to:

receive the in-phase down converted output signal;

filter the in-phase down converted output signal to remove unwanted signals to create a filtered in-phase down converted output signal;

receive the quadrature-phase down converted output signal; and filter the quadrature-phase down converted output signal to remove unwanted signals to create a filtered quadrature-phase down converted output signal.

5. The quadrature RF receiver of claim 4 wherein:

the control circuitry is adapted to provide a mode select signal selecting one of the direct conversion receive mode and the VLIF receive mode; and the quadrature filter circuit is adapted to receive the mode select signal and further comprises:

a plurality of series connected in-phase filter elements adapted to receive the in-phase down converted output signal and provide the filtered in-phase down converted output signal;

an in-phase bypass switch adapted to bypass at least one of the in-phase filter elements for the direct conversion receive mode;

a plurality of series connected quadrature-phase filter elements adapted to receive the quadrature-phase down converted output signal and provide the filtered quadrature-phase down converted output signal; and a quadrature-phase bypass switch adapted to bypass at least one of the quadrature-phase filter elements for the direct conversion receive mode.

6. The quadrature RF receiver of claim 2 further comprising a quadrature gain and phase correction circuit adapted to:

receive the in-phase down converted output signal;

receive the quadrature-phase down converted output signal;

apply an amplitude adjustment and a phase adjustment to the in-phase down converted output signal to create a corrected in-phase down converted output signal; and apply an amplitude adjustment and a phase adjustment to the quadrature-phase down converted output signal to create a corrected quadrature-phase down converted output signal, wherein the corrected quadrature-phase down converted output signal and the corrected in-phase down converted output signal are approximately equal in amplitude and phase-shifted approximately 90 degrees from each other.

7. The quadrature RF receiver of claim 2 further comprising a quadrature analog-to-digital conversion circuit adapted to:

receive the in-phase down converted output signal;

convert the in-phase down converted output signal from an analog signal into a digital signal to create a digital in-phase down converted output signal;

receive the quadrature-phase down converted output signal; and convert the quadrature-phase down converted output signal from an analog signal into a digital signal to create a digital quadrature-phase down converted output signal.

8. The quadrature RF receiver of claim 2 further comprising:

a quadrature filter circuit adapted to:

receive the in-phase down converted output signal;

filter the in-phase down converted output signal to remove unwanted signals to create a filtered in-phase down converted output signal;

receive the quadrature-phase down converted output signal; and filter the quadrature-phase down converted output signal to remove unwanted signals to create a filtered quadrature-phase down converted output signal; and a quadrature analog-to-digital conversion circuit adapted to:

receive the filtered in-phase down converted output signal;

convert the filtered in-phase down converted output signal from an analog signal into a digital signal to create a digital in-phase down converted output signal;

receive the filtered quadrature-phase down converted output signal; and convert the filtered quadrature-phase down converted output signal from an analog signal into a digital signal to create a digital quadrature-phase down converted output signal.

9. The quadrature RF receiver of claim 1 wherein for the VLIF receive mode, the control circuitry is further adapted to select one of a first conversion mode and a second conversion mode based on the RF signal strength signal wherein:

for the first conversion mode, the control circuitry generates the local oscillator control signal to cause the RF mixer circuitry to generate a frequency of the local oscillator signal to be greater than a frequency of a wanted RF input signal; and for the second conversion mode, the control circuitry generates the local oscillator control signal to cause the RF mixer circuitry to generate the frequency of the local oscillator signal to be less than the frequency of the wanted RF input signal.

10. The quadrature RF receiver of claim 1 wherein for the VLIF receive mode, the down converted output signal further comprises a wanted VLIF frequency, wherein the wanted VLIF frequency is inversely related to a magnitude of the RF signal strength signal.

11. The quadrature RF receiver of claim 1 wherein for the VLIF receive mode, the down converted output signal further comprises a wanted VLIF frequency, wherein the wanted VLIF frequency is one of a plurality of frequencies.

12. The quadrature RF receiver of claim 1 wherein for the VLIF receive mode, the down converted output signal further comprises a wanted VLIF frequency, wherein the wanted VLIF frequency is a first VLIF frequency if the RF signal strength signal is greater than or equal to a threshold signal strength, and the wanted VLIF frequency is a second VLIF frequency if the RF signal strength signal is less than the threshold signal strength.

13. The quadrature RF receiver of claim 12 wherein the first VLIF frequency is approximately 120 kilohertz and the second VLIF frequency is approximately 175 kilohertz.

14. A method comprising:
receiving an RF input signal;
receiving a frequency select signal;
providing a down converted output signal based on mixing the RF input signal with a local oscillator signal, which is a function of the frequency select signal;
receiving an RF signal strength signal based on a signal strength of the RF input signal;
selecting one of a direct conversion receive mode and a very low intermediate frequency (VLIF) receive mode;
for the direct conversion receive mode, generating the frequency select signal to cause down conversion of the RF input signal to a baseband signal; and
for the VLIF receive mode, generating the frequency select signal based on the RF signal strength signal to cause down conversion of the RF input signal to a VLIF signal.

15. The method of claim 14 wherein the down converted output signal further comprises an in-phase down converted output signal and a quadrature-phase down converted output signal for the direct conversion receive mode and the VLIF receive mode.

16. The method of claim 15 further comprising:
receiving the in-phase down converted output signal;
filtering the in-phase down converted output signal to remove unwanted signals to create a filtered in-phase down converted output signal;
receiving the quadrature-phase down converted output signal; and
filtering the quadrature-phase down converted output signal to remove unwanted signals to create a filtered quadrature-phase down converted output signal.

17. The method of claim 15 further comprising:
receiving the in-phase down converted output signal;
receiving the quadrature-phase down converted output signal;
applying an amplitude adjustment and a phase adjustment to the in-phase down converted output signal to create a corrected in-phase down converted output signal; and
applying an amplitude adjustment and a phase adjustment to the quadrature-phase down converted output signal to create a corrected quadrature-phase down converted output signal,
wherein the corrected quadrature-phase down converted output signal and the corrected in-phase down converted output signal are approximately equal in amplitude and phase-shifted approximately 90 degrees from each other.

18. The method of claim 15 further comprising:
receiving the in-phase down converted output signal;
converting the in-phase down converted output signal from an analog signal into a digital signal to create a digital in-phase down converted output signal;
receiving the quadrature-phase down converted output signal; and
converting the quadrature-phase down converted output signal from an analog signal into a digital signal to create a digital quadrature-phase down converted output signal.

19. The method of claim 14 further comprising for the VLIF receive mode, selecting one of a first conversion mode and a second conversion mode based on the RF signal strength signal wherein:
for the first conversion mode, generating the local oscillator control signal to cause a frequency of the local oscillator signal to be greater than a frequency of a wanted RF input signal; and
for the second conversion mode, generating the local oscillator control signal to cause the frequency of the local oscillator signal to be less than the frequency of the wanted RF input signal.

20. The method of claim 14 wherein for the VLIF receive mode, the down converted output signal further comprises a wanted VLIF frequency, wherein the wanted VLIF frequency is inversely related to a magnitude of the RF signal strength signal.

* * * * *